Jan. 27, 1925. Re. 15,989

W. S. BOYCE

TIE PLATE

Original Filed Nov. 17, 1923 2 Sheets-Sheet 1

Inventor
William Stephen Boyce
By Wylot A. Brown Atty

Jan. 27, 1925. Re. 15,989
W. S. BOYCE
TIE PLATE
Original Filed Nov. 17, 1923 2 Sheets-Sheet 2
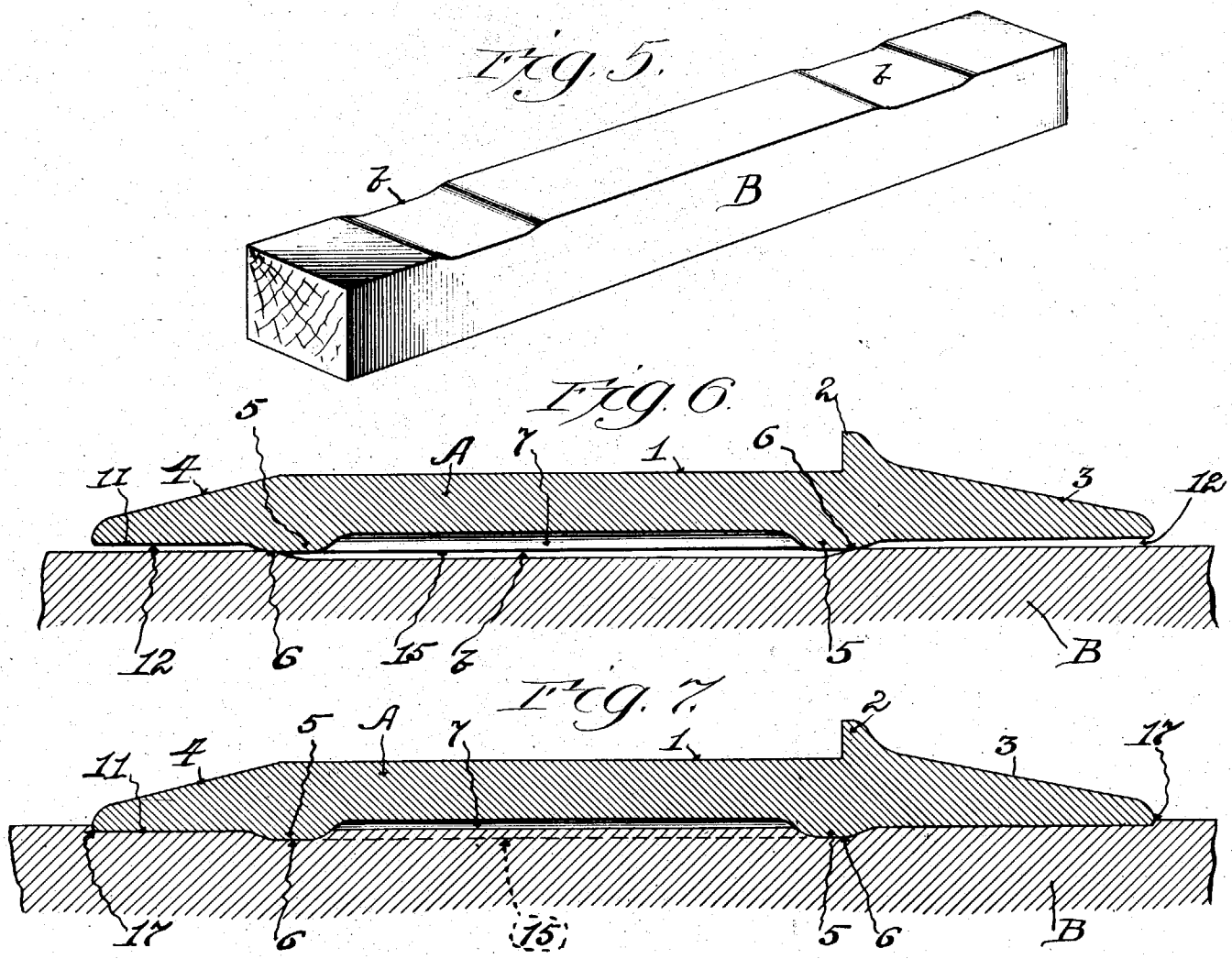
Inventor
William Stephen Boyce
By Wilfred E. Brown Atty Reissued Jan. 27, 1925. Re. 15,989

UNITED STATES PATENT OFFICE.

WILLIAM STEPHEN BOYCE, OF CHICAGO, ILLINOIS.

TIE PLATE.

Original No. 1,497,667, dated June 17, 1924, Serial No. 675,259, filed November 17, 1923. Application for reissue filed November 14, 1924. Serial No. 750,004.

*To all whom it may concern:*

Be it known that I, WILLIAM STEPHEN BOYCE, a citizen of the United States, residing at Chicago, in the county of Cook and State of Illinois, have invented certain new and useful Improvements in Tie Plates, of which the following is a specification, reference being had to the accompanying drawings, and to the reference characters marked thereon, which form a part of this specification.

This invention relates to an improvement in tie plates, and will be herein described in connection with the type known in the trade as "compression" plates; such, for example, as illustrated in United States Letters Patent No. 1,219,224, issued to Edwin H. Bell, on March 13th, 1917.

Compression tie plates are characterized by having on a portion of their under or bottom surfaces, transverse, pointed, tie-engaging ribs and between these ribs, a plurality of parallel, arcuate undulations or depressions, extending lengthwise of the plate and of the tie, and which intersect in lines to form intermediate, parallel ribs extending in the plane of the bottom of the plate and lengthwise thereof. These latter ribs enter the tie between the fibres of the tie and by reason of the curved, arcuate surfaces, compress the fibres together and hence the tradename "compression" tie plates.

While the tie plate of the said Bell patent possesses certain advantages and improvements in the art, it has nevertheless demonstrated in use in track that the sharpened, transverse bottom ribs between which the arcuate depressions extend, actually cut or sever the fibres of the wood when the plate is being seated in the tie. This action of the ribs which are transverse to the grain of the tie is considered by some engineering experts in railroad track construction to be a disadvantage in that it tends to the premature destruction of the tie and also requires a relatively longer period of use in track before the plate becomes properly seated on the tie for prolonged use. During this period and before the plate becomes securely imbedded in the tie, it shifts, more or less, and wabbles on the tie under the "wave motion" and thrusts and strains of the rails due to train movements thereon.

The main object of my invention is to produce a tie plate, the under surface of which is free from all sharp or fibre cutting ribs or edges, while at the same time is possessed of parts on the bottom of the plate adapted to readily enter the tie and seat the plate firmly thereon.

Another object is to strengthen tie plates subjected to bending or breaking strains in such manner as to resist said strains and reduce the tendency to bending or breaking to a negligible quantity; in other words, to produce a tie plate, of the compression or other type, having the minimum of metal and the maximum of rigidity and strength against the buckling or breaking strains to which it will be subjected, combined with the maximum efficiency in the performance of its intended functions.

Another object of my invention is to produce a tie plate having its bottom surface so constructed as to retain all the advantages of the compression grooves or undulations of the compression type of tie plate, while overcoming the objections above referred to, and at the same time producing other advantages.

These and other advantages will appear as I proceed with the description of my invention, which is illustrated herein as applied to a compression type of tie plate, but which is, manifestly, applicable to other types of plate.

In the drawings:

Fig. 5 is a perspective view, on a smaller scale, of a railroad tie showing the adzman's work preparatory to placing a tie plate thereon.

Figs. 6 and 7 are sectional views, similar to Fig. 3, but on a slightly larger scale, showing the two positions the tie plate assumes upon the tie, as hereinafter more fully explained.

Figure 1:
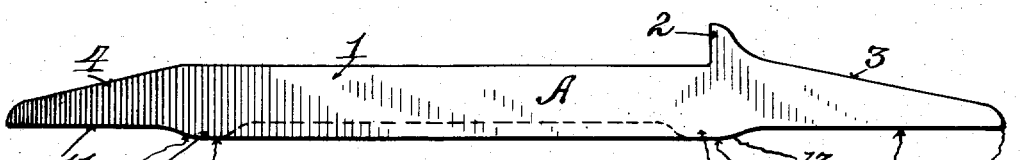
Fig. 1 is an elevation or side view of a tie plate constructed in accordance with my invention.
Figure 2:
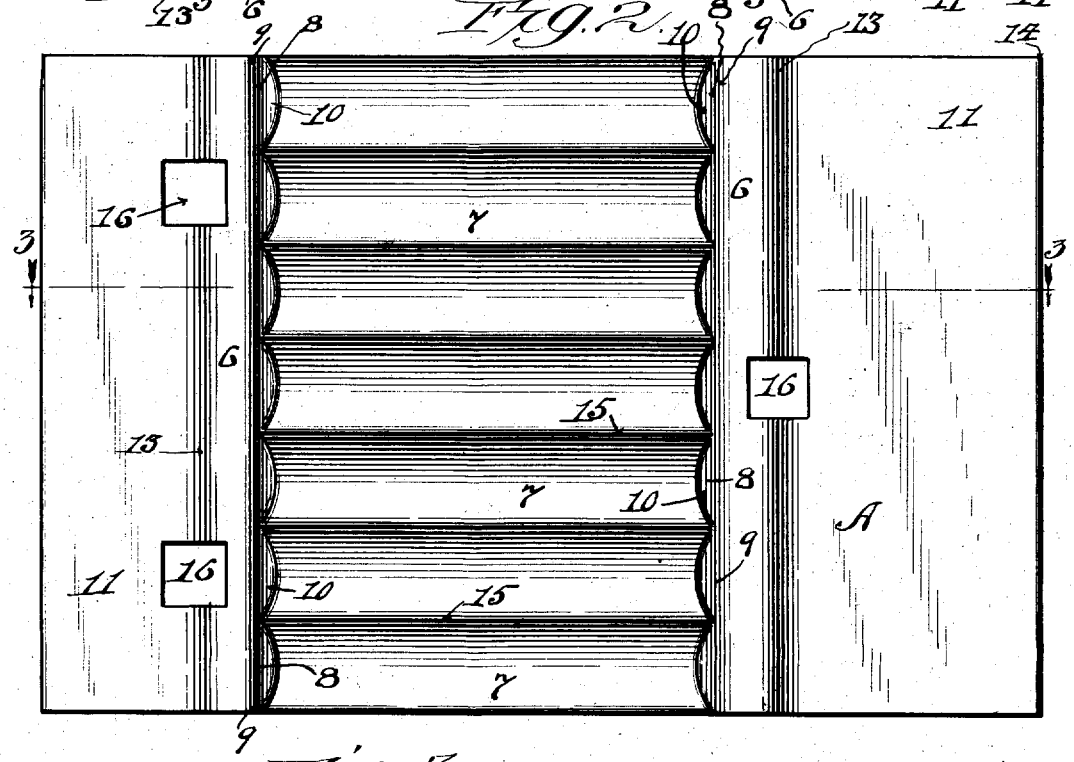
Fig. 2 is a bottom plan view of the same.
Figure 3:
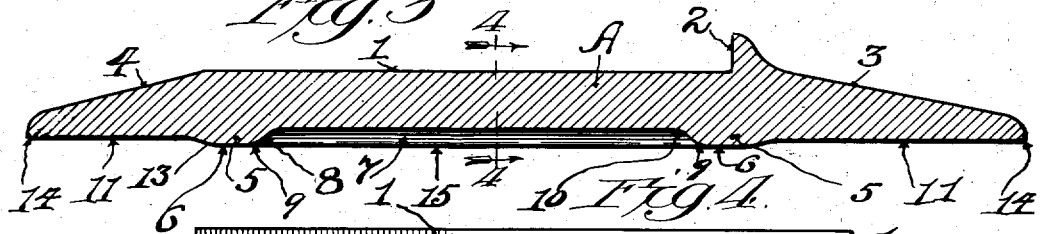
Fig. 3 is a vertical, longitudinal, sectional view through the plate, the section being in the plane of the dotted line 3—3 of Fig. 2.
Figure 4:
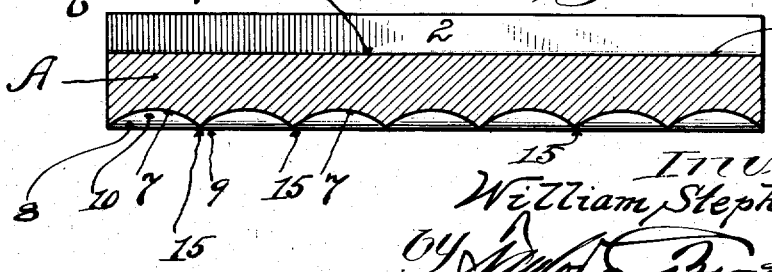
Fig. 4 is a vertical, transverse, sectional view of the tie plate, the section being in the plane of the dotted line 4—4 of Fig. 3.

Referring now more in detail to that embodiment in which I have chosen to illustrate my invention in the accompanying drawings, A represents the tie plate as a whole, the same being of the conventional, rectangular, oblong shape, having a flat rail bearing top surface 1, a transverse rail abutting shoulder 2, and inclined or tapered top end portions 3 and 4. B represents a conventional wooden tie as a whole, having its top surface adzed or cut away, as at *b* for the reception of a tie plate.

The bottom of the plate A is provided with two spaced apart, transversely arranged, flat and relatively narrow, downwardly projecting members 5 having tie bearing surfaces 6, 6. That part of the bottom surface of the plate between these transverse surfaces 6, 6, may be of any desired configuration but as shown in the drawings, in this intermediate portion there are formed a plurality of parallel, arcuate undulations, depressions or grooves 7, 7, which are comparatively flat or shallow. These grooves extend at right angles to the projecting members 5, 5,—that is to say, lengthwise of the plate. The inner or side edges 8 of the members 5, 5, extend at an angle to said surfaces 6, 6, are rounded on top and terminate in a curve at the bottom. Thus a rounded corner 9 is formed at the top and a fillet 10 is formed at the bottom between the side edge 9 and the surface of the groove 7.

The surfaces 11, 11, of the bottom of the plate, beyond the outer edges of the projecting members 5, 5, are formed on a different plane from but, preferably, in a plane parallel to the plane of the bearing surfaces 6, 6. When the bearing surfaces 6, 6, rest upon the tie, a small space, indicated in Fig. 6 at 12, separates the surfaces 11, 11, of the plate ends from the top surface of the tie B. The surfaces 6, 6, are made with rounded corners 13 along their outer margins, and the extreme end margins of the plate are likewise rounded, as indicated at 14.

The arcuate surfaces of the depressions or grooves 7 intersect in a plurality of parallel lines in the plane of the bearing surfaces 6, thereby forming a plurality of parallel ribs 15 extending lengthwise of the plate intermediate the two projecting members 5, 5. These ribs 15 thus run parallel with the grain or fibres of the wood of the tie when the plate A is placed thereon for use. The plate may have spike holes 16, if desired.

It is common practice in track construction, in the laying of new ties in the road bed and also in the relaying of plates and rails upon old ties in track, to shape or fashion the top surface of the ties to receive the tie plate. This is done with an adz, by cutting away a portion of the surface, as indicated at *b* in Fig. 5, so that the plate will be more or less seated in the cut-away space. If the adzman is not skilled, or if he is careless, this work results in the formation of an irregular space *b* so that the plate when first laid on the tie will rest upon spaced apart bearing surfaces in the tie. There being no intermediate support between such bearing surfaces, the plate is thus readily buckled or bent by the passage of the train load over the rail and plate. These bearing surfaces may be projections, such as ribs transversely arranged on the bottom of the plate, or they may be, as in the case of a flat bottom plate, the outer portions of the bottom surface, since the intermediate portion of the bottom of the plate would have no support by reason of the cut away portion *b* of the tie.

Referring to Fig. 6, it will be seen that no such difficulty as just mentioned will occur with the laying of my improved tie plate in track, since, in the first instance, the surfaces 11, 11, of the plate do not rest upon the tie, and only the outer portions of the bearing surfaces 6, 6, and their rounded marginal corners 13, 13, are in contact with the tie. When pressure is brought to bear upon the plate A by the workman in seating the plate or in spiking, or by the passage of a trainload thereover, the load will be from the top surface 1 down through the body of the plate and the metal having the downwardly projecting bearing members 5, and thence to the tie, thus eliminating all tendency to buckling or breaking. These projecting members 5 will almost instantly become imbedded to a slight extent in the tie, and as the downward movement under load continues, the space 12 will be quickly eliminated and the surfaces 11, 11, at each end of the plate, will rest upon the tie. The members, 5, 5 are pressed down into the cut away portion *b* and this is more readily accomplished by reason of the fact that the surfaces 6, 6 are relatively narrow and that each has its outer corner rounded, as at 13. At the same time, where a compression type of plate is used, the ribs 15 begin to engage and enter the tie between the fibres thereof and by reason of the curved, arcuate surfaces of the grooves 7, 7, the fibres are spread apart as the tapered rib 15 continues to move into the tie, compressing the fibres.

In use, the seating of the plate A on the tie B, whether of the compression or other type, will continue until the bottom of the plate is driven into the tie sufficiently so that the surfaces 11, 11, are slightly below the top surface of the tie, as indicated at 17 in Fig. 7. In this position, by reason of the construction above described, together with the spikes used in securing the rail to the plate and the plate to the tie, the plate A will be firmly seated upon and united with the tie B and will resist all tendency to shift or wobble under train load and will lend itself to further depression into the tie as the use in track is continued.

By reason of the fact that the grooves 7 extend lengthwise of the plate and are joined at their opposite ends to the downwardly projecting members 5, 5, by the metal forming the fillets 10, a very strong construction is attained which materially assists in resisting distortion or buckling action by the load transversely passing over the top surface of the plate.

In the case of the compression type of plate, when first placed upon the tie, with the surfaces 6, 6, only, resting thereon, the tendency to bend or buckle is further resisted by the truss construction of a plurality of arched under surfaces intimately joined and cooperating with the longitudinal ribs 15. As the downward thrust continues, the ribs 15 and the surfaces 6, 6, will be entered further into the tie, the fibres being compressed together until a perfect union of plate and tie results. When this occurs, the load is properly transmitted through the plate to the tie.

When tie plates break, the break usually occurs at or adjacent to the juncture of the top surface and the rail abutting shoulder. Where the under side of the tie plate is provided adjacent to this location with sharpened ribs or fibre-cutting projections, it is found that the plate has a greater tendency to break at this point. This objection and difficulty are entirely eliminated by the present invention, together with the rounded corners of the side edges 8 of the relatively narrow bearing members 5, 5, and by the additional metal fillets 10 placed in the plate by joining the side edges 8 with the arcuate surfaces 7, thus giving additional metal where metal is needed without appreciably increasing the weight of the plate.

It will, of course, be understood that while I have shown the rail bearing surface 1 to be flat, such surface may conform to any conventional or special configuration; the canted or the cambered top surface, for instance, coacting equally with my improvements in the bottom of the tie plate. It is also manifest that the construction of the bottom of the plate intermediate the tie bearing surfaces 6, 6, may be of any configuration other than that of the grooves and ribs of the compression type of plate illustrated. These and other changes may be made if desired, provided the essential features, namely: the end bearing surfaces 11, 11, and the transverse, relatively narrow bearing surfaces 6, 6, formed in different planes, and said surfaces being without fibre cutting points or edges, be retained.

I claim as my invention:

1. A tie plate having on its bottom, intermediate its ends, two longitudinally spaced apart, relatively narrow bearing surfaces extending transversely from one side of the plate to the other, a plurality of curved, arcuate compression grooves extending longitudinally between said bearing surfaces, the ends of the plate bottom having flat tie engaging surfaces located beyond the bearing surfaces and in a different plane therefrom, and the arcuate surfaces of the grooves intersecting in a plane coincident with the plane of said bearing surfaces.

2. A tie plate having on its bottom, intermediate its ends, two longitudinally spaced apart, relatively narrow bearing surfaces extending transversely from one end of the plate to the other, a plurality of curved, arcuate compression grooves extending longitudinally between said bearing surfaces, the ends of the plate bottom having flat tie engaging surfaces located beyond the bearing surfaces and in a different plane therefrom, and the arcuate surfaces of the grooves intersecting in a plane coincident with the plane of said bearing surfaces, a curved strengthening fillet joining the compression grooves to the adjacent side margins of the bearing surfaces.

3. A tie plate, the tie engaging bottom of which comprises two transversely extending and longitudinally spaced apart tie bearing surfaces, a plurality of parallel, flattened, arcuate grooves or undulations between said bearing surfaces and extending lengthwise of the plate, the surfaces of said grooves or undulations intersecting to provide a plurality of parallel tie engaging ribs extending in the direction of the length of the plate and located in the plane of the said spaced bearing surfaces, and the bottom surfaces of the ends of the plate being in a different but parallel plane to the plane of the bearing surfaces and ribs.

4. A tie plate having on its bottom, intermediate its ends, two longitudinally spaced apart, relatively narrow bearing surfaces extending transversely from one side of the plate to the other, a plurality of curved, arcuate compression grooves extending longitudinally between said bearing surfaces, the ends of the plate bottom having flat tie engaging surfaces located beyond the bearing surfaces and in a different plane therefrom, and the arcuate surfaces of the grooves intersecting in a plane coincident with the plane of said bearing surfaces, the bearing surfaces being provided with rounded corners throughout their length.

5. A tie plate having on its bottom intermediate its ends, two spaced apart, relatively narrow, downwardly projecting tie bearing surfaces, a median recess in the plate bottom intermediate said narrow surfaces, which latter surfaces are in a different plane from the surfaces of the plate at its ends.

6. A tie plate provided upon its bottom between its ends, with downwardly projecting, relatively narrow and spaced apart bearing members to initially engage the tie when the plate is being seated thereon, the surface of the bottom of the plate at its ends and the bearing surfaces of said narrow members being in different planes.

7. A tie plate having its median and its end portions cut away and separated by relatively narrow, spaced apart, tie bearing surfaces to intially seat on the tie.

8. A tie plate having a median cut away portion in its bottom, and also a cut away portion nearest each end, the surfaces of said cut away end portions being in a different plane from the ultimate bearing surface of said median portion, and flat, relatively narrow, spaced apart and downwardly projecting tie bearing surfaces between the intermediate cut away portion and the end portions, and in a plane different from the plane of the ultimate bearing surface of the intermediate portion when the plate is seated.

In testimony, that I claim the foregoing as my invention, I affix my signature, in the presence of two witnesses, this 12th day of November, 1924.

WILLIAM STEPHEN BOYCE.

Witnesses:

TAYLOR E. BROWN,
B. L. MACGREGOR.